H. O. FLETCHER.
SHOCK ABSORBER.
APPLICATION FILED DEC. 27, 1913.

1,189,439.

Patented July 4, 1916.
3 SHEETS—SHEET 3.

Witnesses:
Fred. S. H. Orcutt.
Elya E. Hodgdon

Inventor,
Henry O. Fletcher.

UNITED STATES PATENT OFFICE.

HENRY O. FLETCHER, OF BOSTON, MASSACHUSETTS.

SHOCK-ABSORBER.

1,189,439.  Specification of Letters Patent.  Patented July 4, 1916.

Application filed December 27, 1913. Serial No. 809,115.

*To all whom it may concern:*

Be it known that I, HENRY O. FLETCHER, a citizen of the United States, and residing at Boston, in the county of Suffolk, State of Massachusetts, have invented certain new and useful Improvements in Shock-Absorbers for Use on Automobiles and the like, of which the following is a specification.

When automobiles are traveling on rough thoroughfares a great deal of annoyance and danger to health is caused by the jolt and jar of the vehicle. The springs are normally under some stress due to the weight of the vehicle body and its occupants, and any slight unevenness in the road is easily taken up by the action of the springs due to the fact that the sustaining power of the springs and weight of the load are evenly balanced, and when the springs are slightly distorted beyond normal the sustaining power is not increased enough to overcome the inertia of the load so as to give it a perceptible movement. When the wheels of the vehicle strike an obstacle the springs are momentarily brought under great stress, and their sustaining power greatly increased, so that it overcomes the inertia of the load and suddenly lifts the body, many times raising the passengers off their seats. As the inertia of the load is now overcome, it continues to rise until the springs are opened so that they have no sustaining power, but instead have a tendency to suddenly lower the body of the vehicle until they are again compressed by its inertia and weight, and again the body is raised by the added sustaining power due to this compression. The latter mentioned movements of the vehicle body usually take place while the passengers are raised from their seats and as they descend they usually come down on the seats during the upward movement of the latter, greatly to their discomfort. When the wheels descend into a rut the body descends, coming down with a jolt and compressing the springs which, in turn, again suddenly raise the body, causing a vibratory movement of the body and its occupants.

Repeated shocks of this kind are very injurious to the physical organism of the human body and it is the object of my invention to overcome these sudden jolts by partially overcoming or retarding the action of the springs in both directions when they are abnormally compressed.

Another object of my invention is, while it reduces the sudden or abnormal actions of the springs, not to interfere with their normal action, for such interference would decrease their elastic quality and would have the effect of stiffening the spring and impair the comfort of the passengers.

Figure 1:
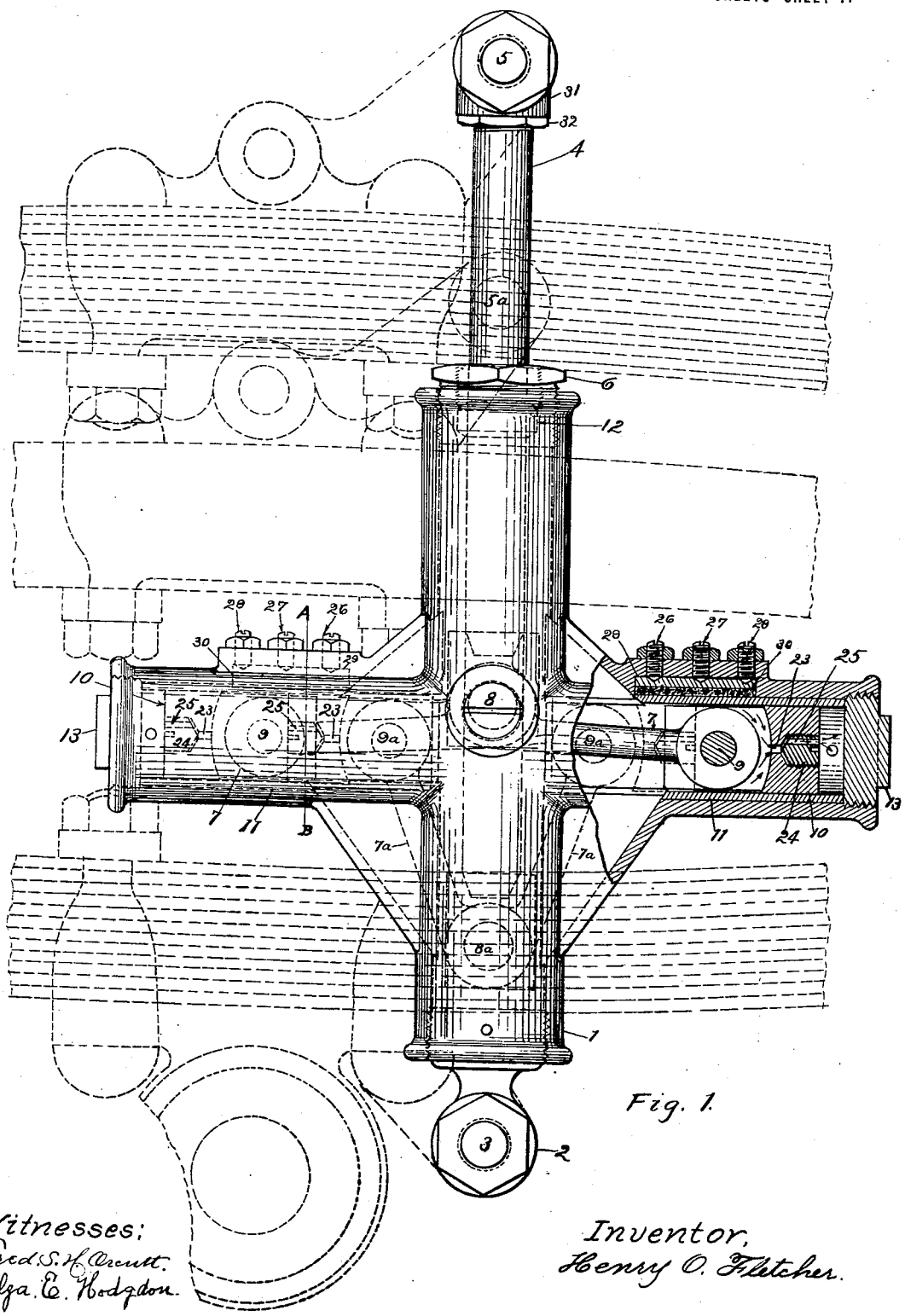
Figure 2:
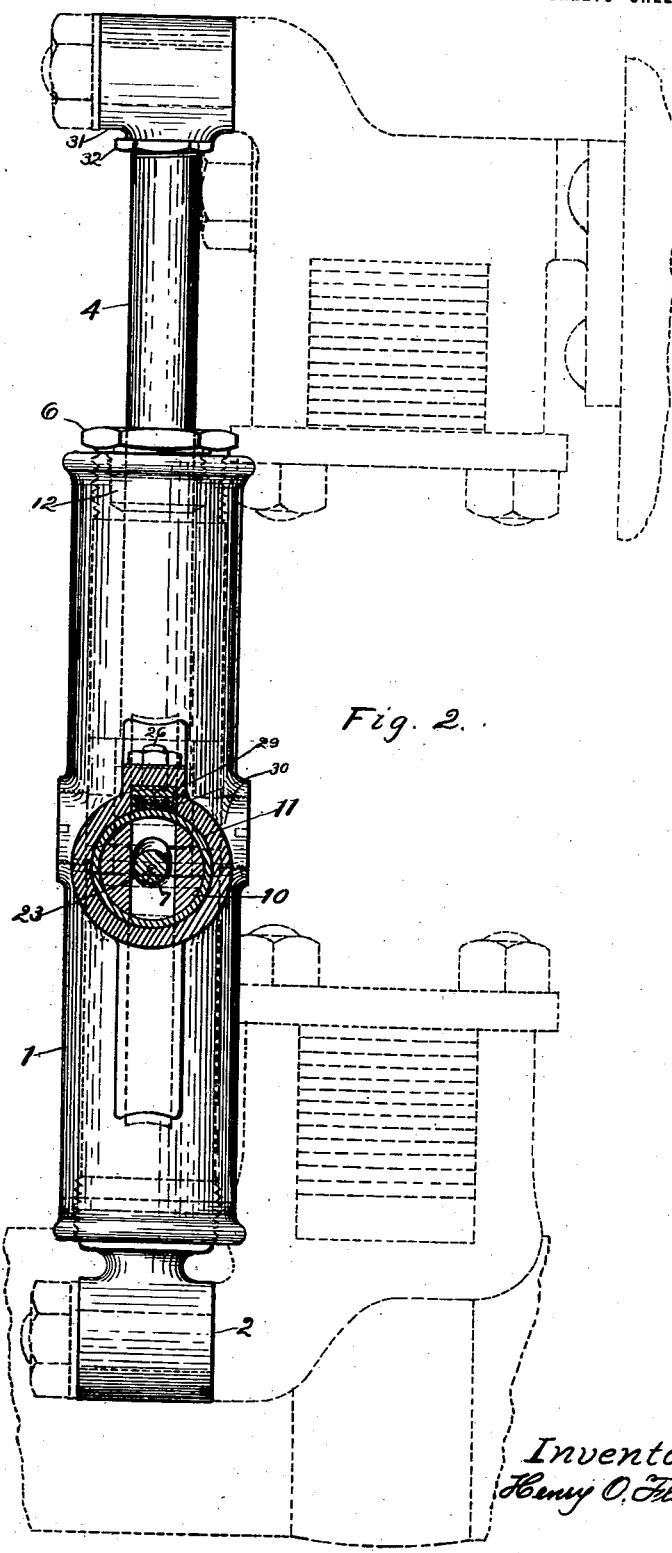
Figure 3:
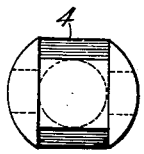
Figure 5:
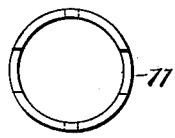
Figure 6:
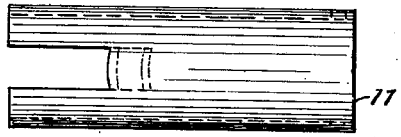
Figure 4:
Figure 7:
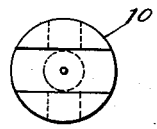
Figure 8:
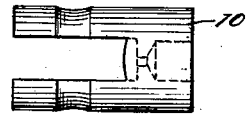
Figure 9:
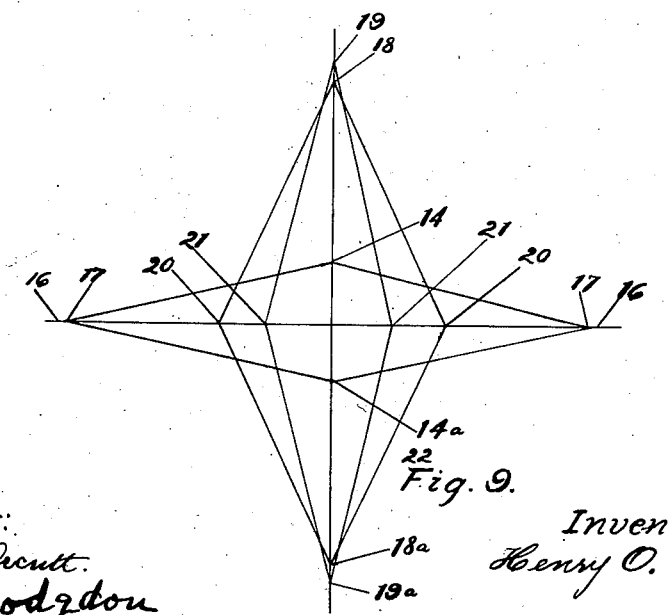

Figure 1 is a side elevation, parts being broken away for clearness of illustration. Fig. 2 is a front elevation showing a section on the line A, B, Fig. 1. Fig. 3 is a plan and Fig. 4 is an elevation of the vertical sliding piston. Fig. 5 is an end view and Fig. 6 is a plan view of the sleeves in which the horizontal plungers slide. Figs. 7 and 8 are end and plan views, respectively, of the horizontal plungers and Fig. 9 is a diagram showing the relative movements of the piston and plungers.

In the drawings like characters represent like parts.

To the body or case 1, is attached the connection 2, which is pivotally attached at 3, to the lower spring or axle housing of the vehicle. The piston 4, is pivotally attached at 5, to the upper spring or body of the vehicle and freely slides in the body or case 1, which is suitably bored out to receive it. The stuffing box 6, acts as a guide to keep the piston 4, in proper alinement.

The links 7, 7, are pivotally connected at 8, to the piston 4, and are also pivotally connected at 9, to the plungers 10, 10. The sleeves 11, 11, are pressed into the body 1, which is bored to receive them.

By referring to Fig. 1 it will be noticed that the hole in the body or case 1, to receive the sleeves 11, 11, is at right angles to and passes through the hole which receives the piston 4, which gives the body 1, the appearance of a cross.

The body or case 1, is filled as nearly full as practicable, with a suitable liquid, which is prevented from leaking or evaporating by the stuffing box 6, containing the packing 12, the plugs 13, 13, and the connection 2, which is made in the form of and acts as a plug.

The parts are made and assembled so that when the vehicle is normally loaded the pivot 8, is near the central portion of its travel and the links in a horizontal position, or nearly so, and any slight movement of the vehicle body relative to that of the axle causes a corresponding movement of the piston 4. As the links 7, 7, are in the form of a toggle the movement of the plungers 10, 10, is so slight that it may be considered negligible.

A greater movement of the vehicle body causes a corresponding greater movement of the piston 4, and consequently of the pivot 8 and as it descends toward the lower extremity of its travel the links 7, 7, have to work through a greater angularity and cause the plungers 10, 10, to travel at a greater rate of speed relative to that of the plunger 4, the extreme position being represented by the dotted lines 5ª, 7ª, 7ª, 8ª, 9ª, 9ª.

The movement of the parts is clearly illustrated by the diagram Fig. 9. While the piston pivot 8, travels from 14 to 14ª, the plunger pivots 9, 9, have a motion from 17 to 16 and back to 17; during the travel of the pivot 8, from 14 to 18 or from 14ª to 18ª the pivots 9, 9, travel from 17 to 20; and while the pivot 8, moves from 18 to 19, or from 18ª to 19ª the pivots 9, 9, move from 20 to 21.

Conversely as the pivot 8 is moved from 19 to 18 or from 19ª to 18ª the pivots 9, 9, travel from 21 to 20; as the pivot 8, travels from 18 to 14 or from 18ª to 14ª the pivots 9, 9, travel from 20 to 17; and while the piston pivot 8, moves between 14 and 14ª the plunger pivots 9, 9, are confined to a movement between 16 and 17.

The plungers 10, 10, are fitted to the sleeves 11, 11, so as not to allow passage of the liquid contained in the body 1, and are provided with small holes 23, 23, through which the liquid passes as the plungers 10, 10, move back and forth in the sleeves 11, 11. The adjusting screws 24, 24, are provided with passages 25, 25, which are eccentric to the center of the screws and consequently out of line with the passages 23, 23, so that, when the screws 24, 24, bottom, no liquid can pass, but when they are slightly relieved the liquid can pass through the passages 23, 23, between the end of the screws 24, 24, and the bottom of the screw holes, thence through the passages 25, 25, as shown by the arrows. When the plungers 10, 10, move toward each other the liquid passes in the direction of the arrows and when the plungers move away from each other the direction of flow of the liquid is reversed. When the piston 4, is traveling near its extreme downward or upward movements, the relative speed of the plungers 10, 10, is greatly increased, due to the angularity of the connecting rods 7, 7, which forces the liquid through the passages 23, 23, 25, 25, much faster, greatly increasing the resistance offered by the piston 4, to the movement of the vehicle body. This resistance is also greatly augmented due to the fact that the piston 4, when near these extreme positions has to move the plungers 10, 10, by applying its force angularly to the direction of their travel instead of directly.

By the foregoing it will be seen that the force tending to move the plungers 10, 10, in either direction becomes more indirect as the piston 4, nears its extreme upward or downward movement, due to the angularity of the links 7, which increases the resistance to the movements of the piston 4, at these positions and consequently to those of the springs when they are under their greatest stresses.

By this arrangement of parts the resistance to the movements of the vehicle springs varies with the stress, but in a much greater proportion, which allays their sudden movements either in a downward or upward direction, thus overcoming the jolting and bouncing action of the vehicle body.

As some vehicles have light bodies mounted on comparatively stiff springs and others have heavy bodies supported by comparatively light springs it is necessary to have some kind of adjustable resistance that may be applied to any point of the movement of the plungers 10, 10. This adjustment I have provided by means of the adjusting screws 26, 26, 27, 27, 28, 28, which are adapted to distort the sleeves 11, 11, by pressing against the plates 29, 29, which in turn transmit the pressure to the sleeves 11, 11, through the slightly yielding mediums which I have shown in the form of packing 30, 30, which may be composed of leather, rubber, spring metal or other yielding material. When more resistance is desired, at the extreme inward positions of the plungers 10, 10, the screws 26, 26, may be adjusted inward; if an increase of resistance is needed near the central movements the screws 27, 27, may be turned downward; if the extra resistance is desired near the outward positions of the sleeves 11, 11, the screws 28, 28, are turned to give the pressure desired.

I have shown three adjusting screws to each plunger but it is to be understood that any practicable number of screws may be employed for this purpose.

In many cases the resistance caused by the pressure of the adjusting screws 26, 26, 27, 27, 28, 28, is not needed, in which case the device is operated by means of the resistance of the liquid alone, and it will be seen that the device may be operated by means of the resistance caused by the pressure of the adjusting screws alone, the liquid being omitted, which in some cases is preferable.

I do not limit my invention to either of the above mentioned ways of accomplishing the desired purpose or to a combination of the two, and in the claims I have covered each separately, and also a combination of both.

The adjusting connection 31, and check nut 32, are provided for the purpose of changing the distance between the pivots 5 and 8, so as to bring the connecting rods 7, 7, to a horizontal position, or nearly so, when the vehicle is normally loaded.

The plungers 10, 10, could be provided with suitable packings to prevent the liquid leaking past them, but I have preferred to fit them to the body 1, in such a manner that packing is not needed.

I have preferably employed two plungers but one, or more than two, could be used.

I have preferred to call the plungers 10, 10, by that name to distinguish them from the piston 4, but the name piston would be as applicable and in the claims I have spoken of them as pistons as well as plungers.

The piston 4, could be fitted to the body 1, in such a manner as to prevent the liquid leaking by it and provided with a passage to offer resistance to the movements of the vehicle body, but I have preferred to allow free passage of the liquid by it for the reason that the resistance would be applied when it would be a detriment.

I am aware that many other additions and changes in form and arrangement of parts may be resorted to without departing from the spirit and scope of my invention.

What I claim as new is set forth in the following claims:

1. In an apparatus of the kind described, vehicle running gear and body elements, a piston connected to and adapted to take the motion of one of said elements, a tightly sealed frame or case, in which the piston is adapted to reciprocate, said case containing a suitable liquid, and connected to and adapted to take the motion of the other element, resisting plungers having passages through which the liquid passes from one chamber of the case to another during the motion of the plungers in both directions and connecting links pivotally connected both to the piston and plungers.

2. In an apparatus of the kind described, vehicle running gear and body elements, a piston connected to and adapted to take the motion of one of said elements, a tightly sealed frame or case, in which the piston is adapted to reciprocate, said case containing a suitable liquid, and connected to and adapted to take the motion of the other element, resisting plungers having adjustable passages through which the liquid passes from one chamber of the case to another during the motion of the plungers in both directions, and connecting links pivotally connected both to the piston and plungers.

3. In an apparatus of the kind described, vehicle running gear and body elements, a piston connected to and adapted to take the motion of one of said elements, a frame or case in which the piston is adapted to reciprocate and which is adapted to take the motion of the other element, sliding resisting members carried by said frame, connecting links pivotally connected to both the piston and resisting members and means to apply frictional resistance to the motion of the resisting members in both directions of their travel.

4. In an apparatus of the kind described, vehicle running gear and body elements, a piston connected to and adapted to take the motion of one of said elements, a frame or case in which the piston is adapted to reciprocate, said case adapted to take the motion of the other element, sliding resisting members carried by said frame, connecting links pivotally connected to both the piston and resisting members and adjustable means to apply frictional resistance to the motion of the resisting members in both directions of their travel.

5. In a shock absorber, a piston element and a body element, having relative movement to each other, resisting members carried by the body element, connecting links pivotally connected to both the piston element and the resisting members and means to frictionally resist the movement of the resisting members in both directions of their travel.

6. In a shock absorber, a body element adapted to carry a suitable liquid, a piston element having relative movement to the body element, resisting plungers having passages to allow the liquid to pass from one chamber to another in the body element during movement of the plungers in both directions, and means to operate the resisting plungers by the piston element.

7. In a shock absorber, a body element adapted to carry a suitable liquid, a piston element having relative movement to the body element, resisting plungers having adjustable passages to allow the liquid to pass from one chamber to another in the body element during movement of the plungers in both directions, and means to operate the resisting plungers by the piston element.

8. In a shock absorber, two elements having relative movement to each other, resisting members carried by one of said elements, connecting links pivotally connected to the other element and also to the resisting members, and means to frictionally resist the movement of the resisting members in both directions of their travel.

9. In a shock absorber, the combination with two elements capable of movement relative to each other, of one or more reciprocating resisting members, means connecting said resisting members to one of said elements by which said resisting members are caused to move in the same direction when the said two elements move relative to each other in either direction from their relative normal position, and means to resist the movement of the resisting members throughout the entire extent of their travel.

10. In a shock absorber, the combination with two elements capable of having movement relative to each other, of one or more reciprocating resisting members, connections between said resisting members and one of said elements by which said resisting members are caused to move in the same direction when the said two elements move relative to each other in either direction from their relative normal position and in the opposite direction when said elements' move relative to each other in either direction toward their relative normal position, and means to resist the movement of the resisting members in both directions of their travel.

11. In a shock absorber, the combination with vehicle running gear and body elements capable of having movement relative to each other, of one or more reciprocating resisting members, connections between said resisting members and one of said elements by which said resisting members are caused to move in the same direction when the said two elements move relative to each other in either direction from their relative normal position, and means to apply an approximately uniform resistance to the movement of the resisting members throughout the entire extent of their travel.

12. In a shock absorber, two elements having relative movement to each other, resisting members carried by one of said elements, means to reciprocate the resisting members positively in both directions by connecting links pivotally connected to the other element and to the resisting members, and adjustable means to frictionally resist the movement of the resisting members in both directions of their travel.

13. In an apparatus of the kind described, vehicle running gear and body elements, a piston connected to and adapted to take the motion of one of said elements, a tightly sealed frame or case in which the piston is adapted to reciprocate, said case containing a suitable liquid and connected to and adapted to take the motion of the other element, resisting plungers, passages being provided through which the liquid passes from one chamber of the case to another during the motion of the plungers in both directions, and connecting links pivotally connected both to the piston and plungers.

14. In a shock absorber, the combination with two elements having movement relative to each other, of one or more resisting members, positive connections between said resisting members and one of said elements whereby relative movement of said elements gives movement to said resisting members, means associated with the other element and operating to guide the resisting members in their movement and also to apply the same resistance to the movement of the resisting members in both directions of their travel.

In witness whereof I hereunto set my hand in the presence of two witnesses.

HENRY O. FLETCHER.

Witnesses:
 FREDERICKA SMITH,
 L. MABEL HODGDON.